April 25, 1933.    A. R. POWELL    1,905,053
TREATMENT OF GAS
Filed Aug. 5, 1931
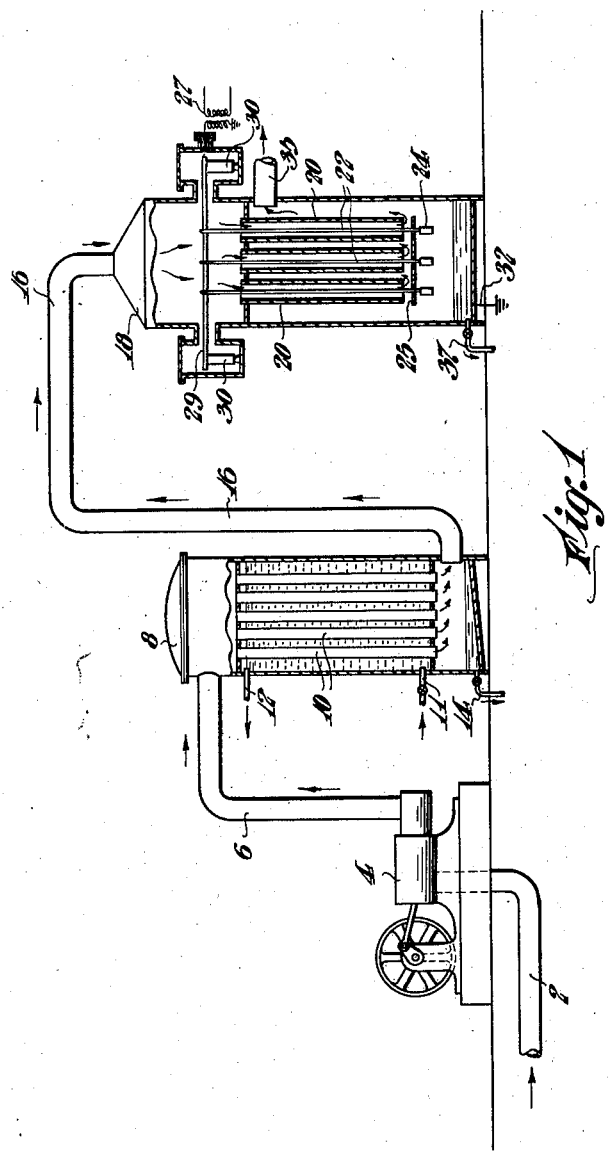
INVENTOR.
Alfred R. Powell.
BY
Jesse R. Langley
ATTORNEY.

Patented Apr. 25, 1933

1,905,053

UNITED STATES PATENT OFFICE

ALFRED R. POWELL, OF ELIZABETH, NEW JERSEY, ASSIGNOR TO THE KOPPERS COMPANY OF DELAWARE, A CORPORATION OF DELAWARE

TREATMENT OF GAS

Application filed August 5, 1931. Serial No. 555,216.

This invention relates to the treatment of fuel gases, such as coke oven gas and the like, to prevent the deposition of gum or resin therefrom during distribution. It relates especially to the treatment of fuel gas which is to be distributed under pressures substantially above atmospheric.

An object of my invention is to provide an improved process of treating fuel gas and the like to prevent the deposition of gum and resin therefrom during distribution, and suitable apparatus therefor.

My invention has for further objects such other operative advantages and results as obtain in the process and apparatus described and claimed herewith.

Manufactured fuel gases, such as coke oven gas, carburetted water gas, and the like generally contain a considerable variety of unsaturated organic compounds, many of which have relatively low molecular weights and exert relatively high vapor pressures. Certain of these unsaturates exhibit a tendency to polymerize or oxidize into compounds of higher molecular weight and lower vapor pressure under suitable conditions of temperature, pressure, oxygen content and moisture content of the gas, etc., and such conditions are frequently encountered during gas distribution.

As a result, in many gas distributing systems these unsaturated compounds which leave the gas manufacturing plant in the form of vapor or gas are more or less gradually converted into compounds incapable of remaining in the gas and these latter compounds condense in the form of a mist or suspensoid which is characterized by extremely small particle size. The particles have a tacky or gummy nature and are frequently carried for considerable distances by the gas stream. They are generally deposited, however, when the gas is subjected to wire drawing, as in passing through a small or narrow orifice or when the direction of flow of the gas stream is suddenly changed.

The gummy or resinous deposits thereby formed tend to build up, causing stoppages of orifices in governors and the like, outages of pilot flames, and other difficulties and inconveniences. The unsaturates tending to cause these troubles are known broadly as gum-formers or gum-forming compounds, and it is believed that several distinct groups of chemical compounds are at least partially included in this class. The particular compound or group of compounds which is most troublesome in any particular instance depends to some extent at least on the source and nature of the gas distributed and on its treatment prior to distribution.

In some instances it is believed that benzenoid gum-formers, such as indene and styrene, are the chief sources of gum trouble. That especially appears to be the case when relatively "wet" gases, such as carburetted water gas with a high condensible oil content, are distributed. Such gases exhibit the gum-forming tendency even when distributed at substantially atmospheric pressure, and it is believed that the oil particles condensed from the gas serve as nuclei for the condensation of gum-formers or scrub them from the gas, thus making possible their polymerization or oxidation in the liquid phase.

When characteristically "dry" gases, such as coke oven gas, are transmitted and distributed at substantially atmospheric pressure deposits of gums and resins seldom if ever are formed even when known gum-formers, such as indene and styrene, are present. When coke oven gas or the like is compressed prior to transmission and/or distribution, however, gum-formers condense during the passage of the gas through the distributing system to form the sticky mass or suspensoid previously described, and then deposit to cause stoppages and other difficulties. It is believed that olefines and especially the di- or even tri-olefines, such as butadiene and cyclopentadiene, are among the chief causes of this type of gum trouble.

I have found that when coke oven gas or the like is compressed, and especially when it is compressed to pressures of 20 pounds or more per square inch, as is usually the case when the gas is to be transmitted for any considerable distance before distribution to the consumers, and then cooled in the usual manner to remove the heat of compression, a very fine mist of oil is produced in the gas. This is due to the fact that the gas is substantially saturated with certain oils, usually oils having a high boiling point range, prior to its compression. These oils may be heavy tar oils, or petroleum oils employed in scrubbing the gas to remove naphthalene or light oil.

This oily mist then serves as a medium or a nucleus for polymerization of gum-forming constituents of the gas in the liquid phase. Even when the gum-formers are present in very small quantities and are compounds of low boiling point and high vapor pressure they are given an opportunity to pass into the liquid phase by dissolving in the condensed oil present as a mist after compression and cooling of the gas.

The presence of this mist of oil in compressed gas is favorable to the polymerization of the gum-formers since it is well known that they polymerize readily when in the liquid state either as pure substances or in solution in other oils. On the other hand, it is believed that there is less tendency for gum-formers to polymerize in (or from) the vapor phase when condensed oil or other liquid medium is not present. It follows therefore that while oil mists in gas are not in themselves gum-forming they make gum-formation (polymerization) possible under conditions such that no polymerization would occur if the mist were not present.

I have found that gum-formation in gas distributing systems is effectively prevented by removing the oily mist from the gas prior to distribution, and I have found that this is most efficiently accomplished by electrical precipitation. This precipitation is preferably the last step in the treatment of the gas prior to admitting it to the gas distributing system or the transmission line, and the gas treated is therefore at least substantially free from tar, ammonia, hydrogen sulphide, and other impurities. The gas may or may not be previously scrubbed to remove naphthalene and/or light oils.

Usually coke oven gas or the like after purification from tar, ammonia, etc., is sent to a holder for storage until it is transmitted to the gas distributing system. When transmission is to be effected under pressure, a compressor withdraws the purified gas from the holder and compresses it to the desired pressure, which may be on the order of 20 pounds per square inch or higher. The gas is then cooled, usually to substantially atmospheric temperature.

This after-cooling removes the heat of compression and frequently results in the condensation of water and/or hydrocarbon constituents from the gas. It also results in the formation of the oil mist described hereinabove. In the practice of my present invention I subject this cooled gas to the influence of a silent electrical discharge or glow discharge in an electrical precipitator, such as the well known Cottrell precipitator, for example. By this method the objectionable oily mist is removed, and the gas can then be distributed without causing deposits of gum or resin in orifices or other devices employed in the distributing system.

A large number of compounds present in fuel gases exhibit the gum-forming tendency, as previously stated, and some of these have relatively high boiling points, in the order of 200° C., and correspondingly lower vapor pressures. Such compounds are more or less completely condensed as a mist along with the heavy oils during compression and after-cooling, and being present in the oily mist they are removed when the gas is treated according to the process of my present invention.

Furthermore, it has been found that subjecting the gas to the influence of the silent or glow discharge promotes the polymerization or oxidation of gum-formers contained therein as described in a copending application of W. L. Shively, Serial No. 557,994, filed August 19, 1931. If this treatment is carried far enough it appears that the gum-formers may be first polymerized and then precipitated. My invention contemplates the removal of gum-formers or gums brought into the solid or liquid state by polymerization under the influence of the electrical discharge, as well as the removal of gum-formers and oil condensed into a mist by compression and cooling.

The potential required for precipitation of the mist and/or the polymerized gums in an electrical precipitator can be produced by a static machine, an induction coil, a high voltage alternating current generator or transformer, or a suitable source of high potential direct current, such as a battery of cells or a rectifier operating on high potential alternating current.

The amount of potential difference required in any particular case depends on the pressure of the gas treated and the distance between the discharge electrode and the collecting electrode. The greater the pressure of the gas the higher the required voltage, and similarly higher voltages are required with tubes or collecting electrodes of larger diameter in a precipitator of the usual type. I have found that the best results are obtained when the voltage is just below the flash-over point or arcing point. This may be when a potential of 50,000 to 60,000 volts is applied to the terminals of a precipitator having tubes 6″ in diameter, for example.

I will now describe with reference to the accompanying drawing a preferred method of practicing my improved process of treating coke oven gas and the like to prevent the deposition of gum or resin therefrom during distribution. In the drawing The single figure is a view partly in elevation and partly in vertical section of apparatus suitable for the practice of my present invention.

Fuel gas such as coke oven gas or the like which has preferably been previously freed from tar, ammonia, hydrogen sulphide and other impurities is withdrawn from a gas holder or other source (not shown) through a pipe 2 into a compressor 4. In this compressor the gas is compressed to the pressure required for transmission to the distributing system, which pressure may be of the order of 20 pounds or more per square inch.

The compressed gas passes through a pipe 6 into an after-cooler 8, which may be of the direct type but is preferably of the indirect type, as shown. The gas passes downwardly through tubes 10 forming a part of the cooler and its heat is transferred to cooling water which may be supplied to the space surrounding the tubes through a pipe 11 and withdrawn through a pipe 12. The gas is cooled to substantially atmospheric temperature, as is usual after compression.

Water or other condensate formed by cooling the compressed gas collects at the bottom of the cooler and may be withdrawn through a pipe 14. The cooled gas containing a mist of condensed heavy oil and/or gum-formers as described hereinabove passes from the cooler through a pipe 16 and enters an electrical precipitator 18.

The precipitator 18 contains a plurality of tubes 20 which serve as collecting electrodes. A wire, rod, or chain 22 passes through each of the tubes 20 in coaxial relation thereto and serves as a discharge electrode. The discharge electrodes are held in place by means of weights 24 and/or a grid 25 through which they may pass or to which they may be attached. Potential is applied to the electrodes from any suitable source such as a rectifier or a transformer indicated diagrammatically at 27.

One of the secondary terminals of the transformer is connected to a bus bar 29 supported on insulators 30 out of contact with the shell of the precipitator. The electrodes 22 are connected to the bus bar 29. The other secondary terminal of the transformer may be grounded as indicated, and the precipitator shell is also grounded, as indicated at 32. When the potential is applied to the electrodes a corona forms around the discharge electrode causing ionization of the gas which passes downwardly through the tubes 20. Solid or liquid particles, such as the oil mist contained in the gas are thereby given a charge and carried to the collecting electrodes which, in the present instance, are the tubes 20.

The gas is thereby freed from the oily mist and/or the particles of gum contained therein, and passes from the precipitator through a pipe 35 to the transmission main or the gas distributing system through which it may be delivered to the consumers without danger of causing deposits of gums and resins. Oil or the like precipitated from the gas in the manner described collects on the tubes 20 and flows therefrom to a sump near the bottom of the precipitator, from which it may be withdrawn through a pipe 37 for any desired disposal.

In the foregoing description the process of my present invention has been described with particular reference to its application to the treatment of gas at a pressure of 20 pounds per square inch or more. It is to be understood, however, that my invention is not limited in its application to the treatment of gas at any particular pressure but may be applied to any gas which is substantially free from tar and the like and which is benefited by the precipitation of oil mists therefrom.

It is also to be understood that the terms "polymerize", "polymerization", etc., as used herein are intended to include not only polymerization in the strict technical sense, but also oxidation and related reactions whereby gum-formers and the like are converted into harmless compounds which usually have higher molecular weight and lower vapor pressure than the gum-formers themselves.

It will be obvious to those skilled in the art that certain changes can be made in the several steps of my process and the several parts of my apparatus without departing from the spirit of my invention, and it is my intention to cover in the claims such modifications as are included within the scope thereof.

I claim as my invention:

1. The process of treating fuel gas, which comprises freeing the gas from tar, ammonia, and other undesirable constituents, compressing the purified gas, cooling the compressed gas to substantially atmospheric temperature, and removing oil mist thereby formed in the gas by electrical precipitation.

2. The process of conditioning fuel gas containing gum-forming constituents for distribution, which comprises removing tar from the gas, compressing the gas to the pressure required for distribution, cooling the gas, and subjecting the gas to the influence of an electrical discharge to remove oily mist formed by compression and cooling, thereby preventing the deposition of gum from the gas during distribution.

3. The process of treating fuel gas to prevent the deposition of gums or resins therefrom, which comprises compressing the gas to a gauge pressure of about 20 pounds per square inch, cooling the compressed gas to substantially atmospheric temperature to cause oily material carried by the gas to appear in the form of a mist, and subjecting the cooled, compressed gas to the influence of an electrical discharge to effect precipitation of said oily mist.

4. The process of treating fuel gas to prevent the deposition of gums or resins therefrom, which comprises removing constituents condensible at ordinary temperatures and pressures, compressing the gas to a pressure materially above atmospheric, cooling the compressed gas to substantially atmospheric temperature to cause oily material carried by the gas to appear in the form of a mist, and subjecting the cooled, compressed gas to the influence of an electrical discharge to effect precipitation of said oily mist.

In testimony whereof, I have hereunto subscribed my name this 3rd day of August 1931.

ALFRED R. POWELL.